Aug. 15, 1961 — G. F. GARDNER — 2,996,128
TRACTOR DRAWN IMPLEMENTS
Filed Sept. 3, 1957 — 2 Sheets-Sheet 1

INVENTOR.
GUY F. GARDNER
BY
Carlson, Pitzner, Hubbard & Wolfe
ATTORNEYS.

Aug. 15, 1961  G. F. GARDNER  2,996,128
TRACTOR DRAWN IMPLEMENTS
Filed Sept. 3, 1957  2 Sheets-Sheet 2

INVENTOR.
GUY F. GARDNER
BY
Carlson, Pitzner, Hubbard & Wolfe
ATTORNEYS.

United States Patent Office 2,996,128
Patented Aug. 15, 1961

2,996,128
TRACTOR DRAWN IMPLEMENTS
Guy F. Gardner, Dearborn, Mich., assignor to Massey-Ferguson Inc., a corporation of Maryland
Filed Sept. 3, 1957, Ser. No. 681,593
7 Claims. (Cl. 172—449)

The invention relates to tractor drawn ground working implements and more particularly to an improved draft and supporting structure for coupling such implements to a tractor.

One object of the invention is to provide a ground working implement embodying novel structure for coupling the implement directly to a tractor having a power elevatable hitch linkage which structure allows the implement to float freely and follow ground contour when working and which holds the implement relatively rigid when it is raised to transport position.

Another object is to provide novel means for coupling an implement to a tractor which is quickly and easily reversible to permit the implement to be drawn with its ground working elements facing in either of two directions so as to take advantage of the different operating characteristics of the elements under such conditions.

Still another object is to provide novel coupling means which permits the implement to be mounted on a tractor equipped with a power operated hitch linkage or to be operated in trailing relation to such a tractor or other towing vehicle.

It is also an object of the invention to provide a draft and supporting structure for tractor drawn implements which is simple and rugged in construction, which is capable of coupling the implement to the tractor in various ways to utilize its operating characteristics to the fullest extent and which can be converted for the different types of coupling very quickly and with a minimum of physical effort.

Other objects and advantages of the invention will become apparent from the following detailed description of the preferred embodiment illustrated in the accompanying drawings, in which FIGURE 1 is a side elevational view of an implement equipped with draft and supporting structure embodying the features of the invention, the implement being shown mounted on the power operated hitch linkage of a tractor.

Figure 1:
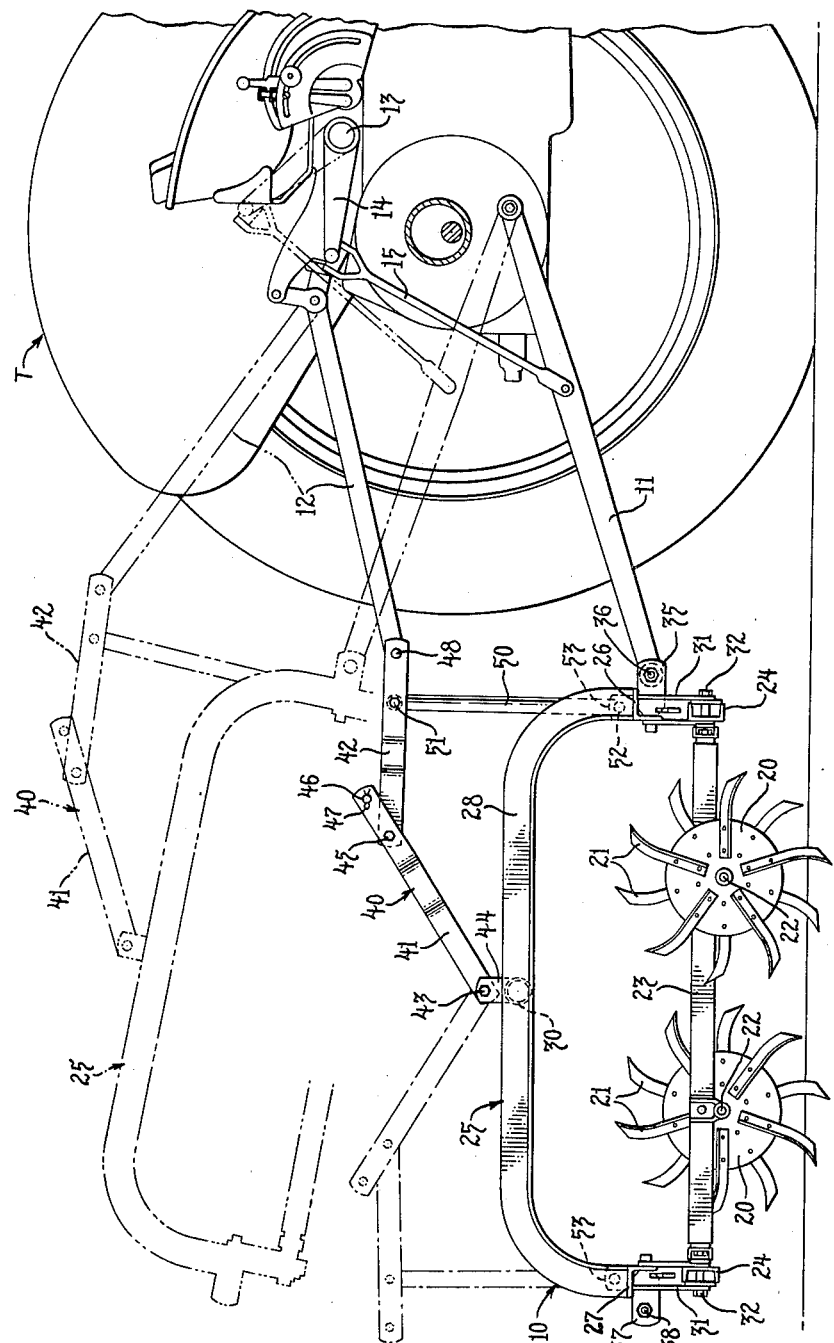

While a preferred form of the invention and its application to a particular type of agricultural implement has been shown and will be described in detail herein, this is not intended to limit the invention to the specific construction or application shown. The intention is to cover all modifications, adaptations and alternative constructions of the invention and its application to other types of implements consistent with the spirit and scope of the invention as expressed in the appended claims.

For purposes of illustration the invention has been shown as incorporated in an agricultural implement 10 of the type commonly known as a rotary hoe. This implement is equipped with suitable coupling means for mounting it on the power operated draft linkage of a tractor T. The particular tractor shown is the well-known Ferguson type tractor which has a pair of laterally spaced draft links 11 pivoted for universal movement on the lower part of the tractor body and trailing rearwardly therefrom. The linkage also includes a control or top link 12 pivoted at its forward end on the tractor body substantially above the pivot connections of the draft links. In such tractors the draft links are adapted to be raised and lowered by power operated means such as a hydraulic ram enclosed in the tractor body and operating through a rock shaft 13 having lift arms 14 at opposite ends connected with the respective draft links by tension links 15.

While the implement 10 selected to illustrate the invention is a rotary hoe, it will be appreciated that the invention is applicable to other types of implements which have a plurality of ground working elements spread over a relatively large area and which require a free floating mounting for proper operation. Such mounting allows the ground working elements to adjust to changes in ground contour so that all can operate at substantially the same working depth whether the ground is flat or has a rolling contour.

The exemplary implement is equipped with ground working elements or hoes, each comprising a disc 20 carrying a plurality of generally radially projecting fingers 21. In implements of this type the fingers are conventionally formed with curved outer end portions, the fingers all curving in the same direction.

To obtain flexibility, the hoes are assembled in relatively small units arranged end-to-end transversely of the direction of travel of the implement. Each unit, in this instance, comprises two groups of hoes mounted on separate shafts 22 spaced apart fore-and-aft of the implement and supported on a subframe 23. The hoes of these two groups are usually staggered relative to each other so that each follows a separate path when drawn over the ground.

Usually, two or more of the units are assembled end-to-end and mounted on transverse frame members 24 for independent pivotal movement about axes parallel to the path of travel of the implement. The frame members themselves may be constructed in sections hinged together to permit the outermost units to be folded upwardly to reduce the overall width of the implement for passage through narrow gates and for highway transport.

The transverse frame members 24, in turn, are carried by a superstructure or main frame 25 through which connection is made with the tractor or other vehicle by which the implement is to be pulled. Preferably the frame members 24 are supported for pivotal movement about axes parallel to the axis of the subframe to increase the flexibility of the implement. It will be evident that when the implement is simply resting on the ground, the pivotal mounting described will permit the individual units as well as the superstructure, to tilt both laterally and fore-and-aft to conform to ground contour. In other words, the hoe units have freely floating support so that soil penetration will be substantially uniform over the entire width of the implement.

While the free floating action above described is essential to the proper working of the implement, it makes it difficult to transport the implement when raised from the ground. This difficulty is overcome by the novel construction of the main frame 25 and the draft and support structure incorporated in that frame. More particularly, the construction is such that the free floating action is maintained when the implement is working coupled directly to a tractor but when raised for transport the implement is rigidly held against objectionable movement.

Figure 2:
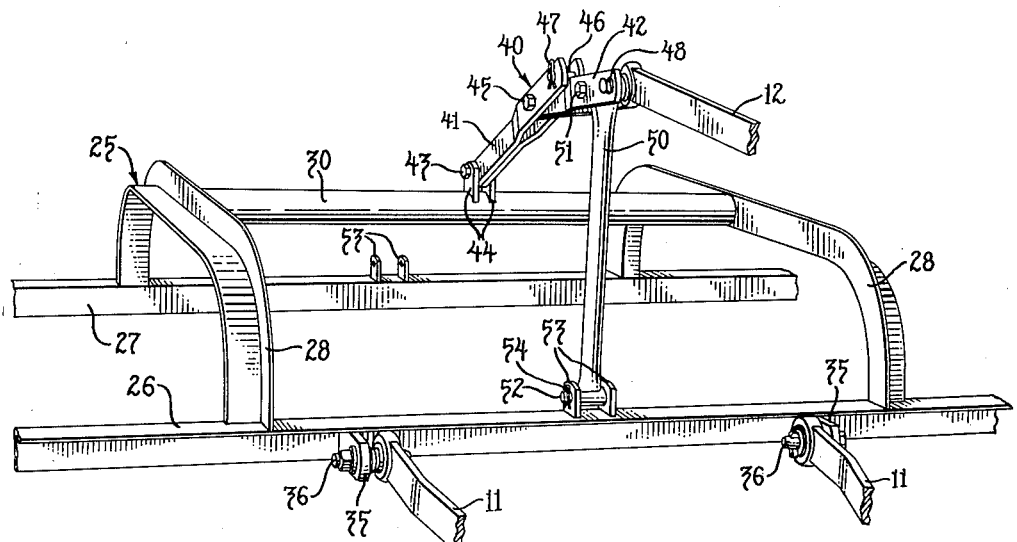
FIG. 2 is a fragmentary perspective view of the draft and supporting structure of the implement shown in FIG. 1.
Figure 3:
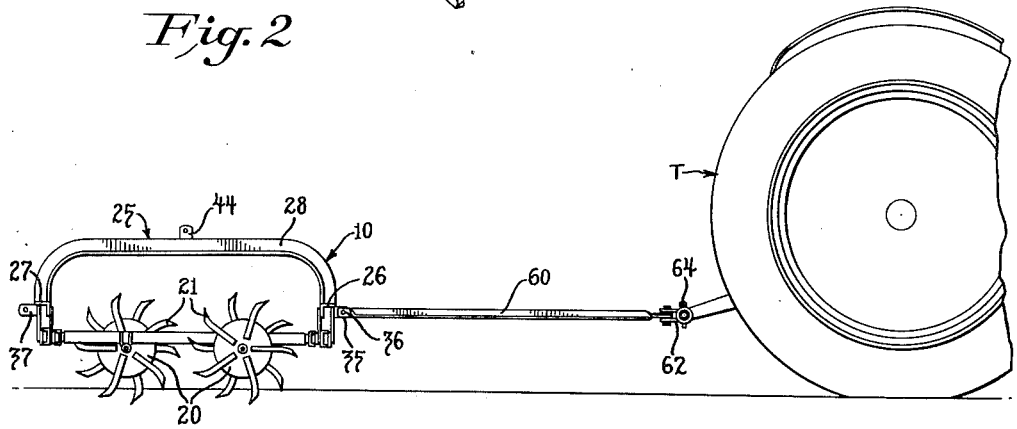
FIG. 3 is a side view of the implement coupled for operation in trailing relation to a tractor.
Figure 4:
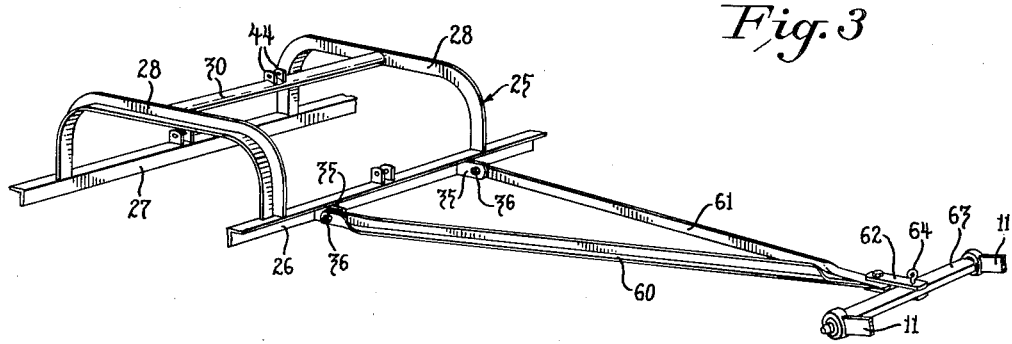
FIG. 4 is a fragmentary perspective view of the implement coupled to the tractor drawbar as shown in FIG. 3.

In carrying out the invention the main frame 25 is constructed as shown in FIG. 2 with parallel frame members 26 and 27, conveniently called front and rear members, although either may occupy a leading position depending upon the direction in which the implement is drawn. The frame members 26 and 27, herein shown as heavy angle bars, are connected to form a rigid structure by inverted U-shaped or arched members 28 having their depending legs welded or otherwise suitably attached to the frame members. In the particular implement shown, two of the U-shaped members are provided, such members being spaced apart laterally and located substantially equidistant from the center line of the frame structure. A transverse member 30 which may be in the form of a tube or bar, connects the U-shaped members substantially at their mid points. Brackets 31 (FIG. 1) depending from the frame bars provide support for the frame members 24 which are pivotally secured to the brackets as by bolts 32.

Suitable coupling means are provided on the frame members 26 and 27 for connection with tractor draft links 11. The coupling means on the frame member 26 comprises a pair of ears 35 welded or otherwise rigidly fixed to the frame member in symmetrical relation to the center line of the frame structure and projecting outwardly therefrom as shown in FIG. 2. Each of the ears carries a coupling pin 36 extending parallel to the frame member and adapted to be received in the apertured ball commonly provided at the trailing end of each of the draft links 11. Similar ears 37 carrying pins 38 are provided on the frame member 27 for cooperation with the draft links 11 when the implement is to be drawn in what may be termed a rearward direction.

For connecting the implement with the tractor top link, the invention provides a novel coupling means or linkage 40 which allows the implement to "float" when working but which holds it securely against objectionable movement when raised for transport. Specifically, the linkage leaves the implement free for fore-and-aft tilting when lowered to ground engaging position which, with the pivotal mounting of the hoe units, permits the implement to float in conformity with changes in the contour of the ground over which the hoes are operating. The action of the linkage 40 in holding the implement against objectionable movement is brought into operation automatically when raised to transport position. With the implement thus held, the tractor may be driven safely at the usual road speeds. Furthermore, the coupling means or linkage 40 is constructed and related to the implement frame in a novel manner which makes it reversible for operation with the tractor coupled to either of the frame members 26 or 27.

In the preferred form shown, the coupling means or linkage 40 comprises jointed links consisting of two sections 41 and 42 pivotally connected together. At its free end, the section 41 is pivotally attached to the frame structure 25 to swing fore-and-aft, preferably by means of a bolt 43 extending through suitably apertured upstanding ears 44 welded to the cross member 30. The ears are positioned so as to locate the coupling means substantially at the center line of the implement and the pivot point midway between the two frame members 26 and 27.

At its other end, the link section 41 is forked to receive the end of the companion section 42 which is secured thereto as by a bolt 45 for pivotal movement. It is to be noted that the apertures for accommodating the bolt 45 are located a substantial distance inwardly from the forked end of the section 41 so that the end of the section tends to overlap and telescope over the adjacent end of the section 42 as the sections approach axial alinement. Adjacent its forked end the section 41 is provided with means defining an abutment engageable with the edge of the section 42 to limit relative movement of the sections toward alined positions. The abutment, in this instance, is defined by a cross pin 46 inserted through alined holes in the forked end of the member and held in place as by a removable cotter pin 47.

The link section 42 is also forked at the end remote from its connection with the section 41 and adjacent such end it is provided with coupling means for connection with the tractor top link 12. The coupling means may conveniently comprise a bolt or pin 48 insertable in holes in the legs of the section and through the apertured ball connection conventionally provided on the tractor link.

A rigid strut or post 50 connected between the link section 42 and the main frame 25 provides a fulcrum for the section and holds it in spaced relation to the frame. The upper end of the post 50 is dimensioned to fit within the forked end of the section 42 and is secured thereto as by a bolt 51 inserted through alined holes spaced inwardly from the coupling pin 48. At its lower end, the post is formed to provide a transversely disposed socket for a pin 52 by which it may be releasably connected to either of the frame members 26 or 27. For this purpose each of the frame members is provided with a pair of upstanding ears 53 spaced apart to receive the socketed end of the post and apertured for the accommodation of the pin. A cotter pin 54 or the like serves to hold the pin 52 in place while permitting its easy removal when required.

The dimensions of the various elements of the coupling linkage 40 and their relationship to each other and to the frame structure 25 is such that when the implement is lowered to the working position in which it is shown in full lines in FIG. 1, the sections 41 and 42 jackknife or swing toward each other to raise the abutment pin 46 from engagement with the section 42. This leaves the implement free to rock fore-and-aft through an angle sufficient to maintain substantially parallel relation to the ground surface. Since the individual hoe units and the frame structure are free to tilt laterally, the implement may be said to float on the individual hoes so that all exert substantially equal pressure on the ground regardless of changes in surface contour. Accordingly, the hoes will all operate at substantially the same depth and maintain a uniform working depth as the implement is drawn over the ground.

If the tractor hitch linkage is raised, the implement tends to tilt rearwardly and thus swing the link sections 41 and 42 toward alined position. Such swinging is limited by the abutment pin 46 engaging the upper edge of the link section 42. Due to the weight of the implement, the sections are more or less rigidly locked together and conditioned to act as a rigid bar for holding the implement securely against objectionable swaying or tilting when it is raised to the transport position shown in broken lines in FIG. 1. The tractor and attached implement may therefore be run at the usual road speeds without excessive bouncing or swaying of the implement or without imposing excessive strains on any part of the equipment.

The coupling linkage 40 has the further advantage of being able to function equally well with the tractor draft links coupled to the pins 38 on the rear frame member 27 instead of to the front frame member as above described. The linkage can be conditioned for such operation without removing any bolts or other permanent fastenings. All that is necessary is to withdraw the stop pin 46 and the pivot pin 52 for the post 50. The entire linkage can then be swung from the position shown in FIGS. 1 and 2 to the opposite side of the implement frame. In this reversal, the post 50 pivots 180° about the bolt 51 to bring its lower end between the ears 53 on the frame member 27. The pin 52 may then be inserted to anchor the post to that frame member. The removal of the stop pin 46 permits the link section 42 to swing to the other side of the section 41. The pin is then replaced to condition the linkage for functioning precisely as described above when the tractor hitch linkage is coupled to the other side of the implement.

While the improved implement is particularly well suited for direct mounting on a tractor operated power hitch linkage as above described, it is readily adaptable for operation in trailing relation to the tractive vehicle. For this purpose there is provided a draft linkage comprising a pair of elongated bars 60, 61 arranged to converge at their forward ends and pivotally connected to a suitable coupling device 62. In the particular arrangement shown, the bars 60, 61 are angle bars with their forward ends flattened for reception in the coupling device herein shown as a clevis adapted for disengageable attachment to a draw bar 63 connected in the usual manner to the draft links 11 at the tractor T.

At their rear ends the bars 60, 61 are apertured and preferably provided with connecting elements similar to those of tractor draft links for reception of the pins 36 or 38 provided on the implement frame. As the bars 60, 61 are individually pivoted to the clevis, they may be quickly and easily engaged to the coupling pins on the implement frame. The clevis, of course, is pivotally attached to the draw bar 63 as by a pin 64 so that the implement is trailed behind the tractor but left free for floating movements to enable it to follow changes in the ground contour. As the coupling linkage 40 is not required for this type of operation, it may be completely removed from the implement by disengaging the pin 52 and removing the bolt 43.

It will be apparent from the foregoing that the invention provides a ground working implement of novel and advantageous construction. The novel means is provided for coupling the implement to the tractor having a power elevatable hitch linkage, permitting the implement to float freely and follow ground contour when working. However, when raised to transport position the coupling acts to hold the implement securely against objectionable movements so that the tractor and implement may be operated at the usual road speed without danger. The improved coupling linkage provided by the invention is further advantageous in that it is readily reversible to permit coupling the tractor to either end of the implement without requiring any changes or modifications in the implement structure that involve the removal of bolts or other permanent fastening elements. Full advantage may thus be taken of the different operating characteristics of the implement when drawn forwardly or rearwardly.

I claim as my invention:

1. In a ground working implement for use with a tractor having a rearwardly trailing power elevatable hitch linkage including a pair of laterally spaced draft links and a top link, the combination of a frame structure supporting the ground working elements of the implement, including transversely disposed front and rear members, spaced coupling elements on both members for alternative connection with the draft links of the tractor, a linkage comprising two sections having their ends pivotally connected together, the free end of one of said sections being pivotally connected to the frame structure and the free end of the other of said sections having coupling means for connection with the top link of the tractor, the pivot connection of said linkage with said frame being located substantially midway between the coupling elements on the respective frame members to permit swinging to either end of the implement while remaining connected thereto for cooperation with the tractor top link with the draft links coupled to the elements on either frame member, and cooperating stop means on said sections limiting their relative pivotal movements in one direction.

2. In a ground working implement for use with a tractor having a power elevatable hitch linkage including a pair of pivoted laterally spaced draft links and a top link trailing from its rear end portion, the combination of a frame structure supporting the ground working elements of the implement including transversely disposed front and rear frame members, a pair of cross members spaced apart laterally and connecting said frame members to form a rigid structure, a bar extending between and rigidly connecting said cross members substantially centrally of the frame structure, spaced coupling elements on said frame members for connection with the draft links of the tractor, and a linkage pivotally connected at one end to said bar and having coupling means at its other end for connection with the top link of the tractor, the pivot for said linkage being located substantially centrally of said frame structure for cooperation with the tractor top link when the draft links are connected to the coupling elements on either frame member.

3. In a ground working implement for use with a tractor having a power elevatable hitch linkage including a pair of pivoted laterally spaced draft links and a top link trailing from its rear end portion, the combination of a frame structure supporting the ground working elements of the implement including transversely disposed front and rear frame members, a pair of inverted U-shaped members spaced apart laterally and connecting said frame members to form a rigid structure, a bar extending between and rigidly connecting said U-shaped members, spaced coupling elements on said frame members for connection with the draft links of the tractor, a pair of links pivotally connected together in end-to-end relation, means pivotally connecting the free end of one of said links to said bar, coupling means at the free end of the other link for connection with the top link of the tractor, an upright post pivotally connected at its upper end to said other link intermediate the ends of the link, the pivot for the free end of said one link being located so that the pivot for said post may be positioned above either frame member and the coupling means on said other link positioned for connection with the tractor top link when the tractor draft links are connected to the coupling means on the corresponding frame member, and means on each frame member for effecting a releasable connection with said post.

4. In a ground working implement for use with a tractor having a power elevatable hitch linkage including a pair of laterally spaced draft links and a top link trailing from its rear end portion, the combination of a transversely disposed rigid frame supporting a plurality of ground working elements, laterally spaced coupling means on the frame for connection with the tractor draft links, means including a linkage connecting the implement frame to the tractor top link, said linkage comprising two link sections connected respectively to said frame and to the top link and interconnected for relative pivotal movement to permit free fore-and-aft tilting of the implement when in ground working position, and means on one link section defining an abutment engageable by the other link section to restrain said sections against relative movement when the implement is raised to transport position by the tractor hitch linkage, said sections acting when the implement is raised to hold the implement against objectionable movements during transport by the tractor.

5. In a ground working implement for use with a tractor having a power elevatable trailing hitch linkage including a pair of laterally spaced draft links and a top link, the combination of a transversely disposed frame, coupling means on the frame for connection with the tractor draft links, a sectional link having one section pivoted to said frame and the other section provided with coupling means for attachment to the tractor top link, means on said frame providing a fulcrum for said other section, said sections swinging relative to each other to allow the frame to tilt fore-and-aft when lowered to ground working position, the weight of the implement swinging the sections toward alined positions when raised from the ground, and means on one of said sections cooperating with the other section to limit the swinging of the sections toward alined position, said limiting means and said fulcrum cooperating with said sections to restrain the implement against objectionable tilting movements when transported in a raised position.

6. In a ground working implement for use with a tractor having a power operated hitch linkage including a pair of pivoted trailing draft links and a pivoted trailing top link adapted to be swung between a lower operating position and a raised transport position, the combination of a frame structure supporting the ground working elements of the implement including a pair of transverse frame members spaced apart fore-and-aft and also vertically, coupling means on the lower frame member for connection with the tractor draft links, a linkage for connecting the upper frame member with the tractor top link, said linkage comprising a pair of link sections connected together for relative pivotal movement, abutment means on one section engageable with the other section to limit their movements in one direction, means pivotally connecting one of said sections to the upper frame member, coupling means on the other section for connection with the tractor top link, means providing a fulcrum on the frame structure for said other section, said fulcrum and the pivots for said sections being related so that the sections swing together and allow the implement to float freely when lowered to the working position, said sections swinging in the opposite direction to the limit position defined by said abutment means and operating to restrain the frame structure against objectionable movements when the implement is raised to transport position.

7. In a ground working implement for use with a tractor having a power operated hitch linkage including a pair of pivoted trailing draft links and a pivoted trailing top link adapted to be swung between a lower operating position and a raised transport position, the combination with a frame structure supporting the ground working elements of the implement including a pair of transverse frame members spaced apart fore-and-aft and also vertically, coupling means on the lower frame member for connection with the tractor draft links, a sectional linkage for connecting the upper frame member with the tractor top link, said sectional linkage comprising a first section pivoted at one end on the upper frame member, a second section pivotally connected to said first section at a point spaced from the free end of the section, coupling means on said second section for connection with the tractor top link, a rigid post secured at its lower end to the lower frame member and pivotally connected at its upper end intermediate the ends of said second section, the several pivots for said sections being spaced apart to permit free floating movement of the frame structure when the implement is in working position, said sections tending to move into axial alinement when the implement is raised toward transport position, and means defining an abutment adjacent the free end of said first section engageable with the second section to limit the movement of the sections toward alinement and adapt the sections to function as a rigid bar effective to hold the frame against floating movements when raised to transport position.

References Cited in the file of this patent

UNITED STATES PATENTS

| | | |
|---|---|---|
| 1,854,822 | Benjamin | Apr. 19, 1932 |
| 2,352,466 | Arps | June 27, 1944 |
| 2,472,386 | Schmeiser | July 7, 1949 |
| 2,595,091 | Moores | Apr. 29, 1952 |
| 2,617,343 | Warne | Nov. 11, 1952 |
| 2,712,278 | Wilson | July 5, 1955 |
| 2,769,295 | Northcote | Nov. 6, 1956 |
| 2,772,616 | Gonzalez | Dec. 4, 1956 |
| 2,839,980 | Evans et al. | June 24, 1958 |

FOREIGN PATENTS

| | | |
|---|---|---|
| 922,021 | Germany | Jan. 7, 1955 |